United States Patent
Natanzon et al.

(10) Patent No.: US 10,601,856 B1
(45) Date of Patent: Mar. 24, 2020

(54) METHOD AND SYSTEM FOR IMPLEMENTING A CLOUD NATIVE CROWDSOURCED CYBER SECURITY SERVICE

(71) Applicant: EMC IP Holding Company LLC, Hopkinton, MA (US)

(72) Inventors: Assaf Natanzon, Tel Aviv (IL); Amit Lieberman, Raanana (IL); Oron Golan, Meitar (IL); Yuri Manusov, Beer Sheva (IL); Raul Shnier, Kibbutz Ruhama (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 224 days.

(21) Appl. No.: 15/795,744

(22) Filed: Oct. 27, 2017

(51) Int. Cl.
| | |
|---|---|
| H04L 29/06 | (2006.01) |
| G06F 21/55 | (2013.01) |
| G06F 21/53 | (2013.01) |
| G06F 21/57 | (2013.01) |
| G06F 21/56 | (2013.01) |
| H04L 12/26 | (2006.01) |

(52) U.S. Cl.
CPC .......... H04L 63/1433 (2013.01); G06F 21/53 (2013.01); G06F 21/552 (2013.01); G06F 21/563 (2013.01); G06F 21/577 (2013.01); H04L 43/04 (2013.01); H04L 63/20 (2013.01)

(58) Field of Classification Search
CPC ..... H04L 63/1433; H04L 63/20; H04L 43/04; G06F 21/563; G06F 21/577; G06F 21/53; G06F 21/552
See application file for complete search history.

(56) References Cited

U.S. PATENT DOCUMENTS

| | | | | |
|---|---|---|---|---|
| 10,521,593 | B2 * | 12/2019 | Kaplan | G06F 21/577 |
| 2014/0137257 | A1 * | 5/2014 | Martinez | H04L 63/1433 726/25 |
| 2015/0172311 | A1 * | 6/2015 | Freedman | H04L 63/1433 726/1 |
| 2017/0075793 | A1 * | 3/2017 | Tahboub | G06F 11/3672 |
| 2017/0109270 | A1 * | 4/2017 | Ekambaram | G06F 11/3688 |
| 2017/0289174 | A1 * | 10/2017 | Kaplan | H04L 63/1433 |
| 2018/0027006 | A1 * | 1/2018 | Zimmermann | H04L 63/0245 726/11 |
| 2018/0034846 | A1 * | 2/2018 | Marquez | H04L 63/1433 |
| 2019/0124108 | A1 * | 4/2019 | Doyle | H04L 63/1433 |

OTHER PUBLICATIONS

Murturi, et al., "A Reference Model for Crowdsourcing as a Service", Nov. 23, 2015; 2015 IEEE 4th International Conference on Cloud Networking (CloudNet) (Year: 2015).*

Su, et al., "Crowdsourcing Platform for Collaboration Management in Vulnerability Verification", Nov. 10, 2016; The 18th Asia-Pacific Network Operations and Management Symposium (APNOMS) 2016 (Year: 2016).*

* cited by examiner

Primary Examiner — J. Brant Murphy
(74) Attorney, Agent, or Firm — Chamberlain, Hrdlicka, White, Williams & Aughtry

(57) ABSTRACT

A method and system for implementing a cloud native crowdsourced cyber security service. Specifically, the disclosed method and system entail leveraging existing disaster recovery (DR) solutions to perform cyber security assessments on cloud native application images restored within isolated cloud-based testing sandboxes. In leveraging existing DR solutions, a crowdsourced cyber security service is integrated into the existing DR solution as an additional feature.

20 Claims, 7 Drawing Sheets

//www.w3.org/1999/xhtml">
METHOD AND SYSTEM FOR IMPLEMENTING A CLOUD NATIVE CROWDSOURCED CYBER SECURITY SERVICE

BACKGROUND

The execution of cyber security assessments on an actual computing system by intentionally subjecting the actual computing system to cyber security attacks presents a major risk to, despite the benefits of attempting to protect, the actual computing system through the performance of such assessments.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for implementing a cloud native crowdsourced cyber security service. Specifically, one or more embodiments of the invention entail leveraging existing disaster recovery (DR) solutions to perform cyber security assessments on cloud native application images restored within isolated cloud-based testing sandboxes. In leveraging existing DR solutions, a crowdsourced cyber security service is integrated into the existing DR solution as an additional feature. In one or more other embodiments of the invention, the crowdsourcing cyber security service disclosed herein may be applied to non-cloud based applications (i.e., any software applications executing within virtual machines, etc.).

Figure 1:
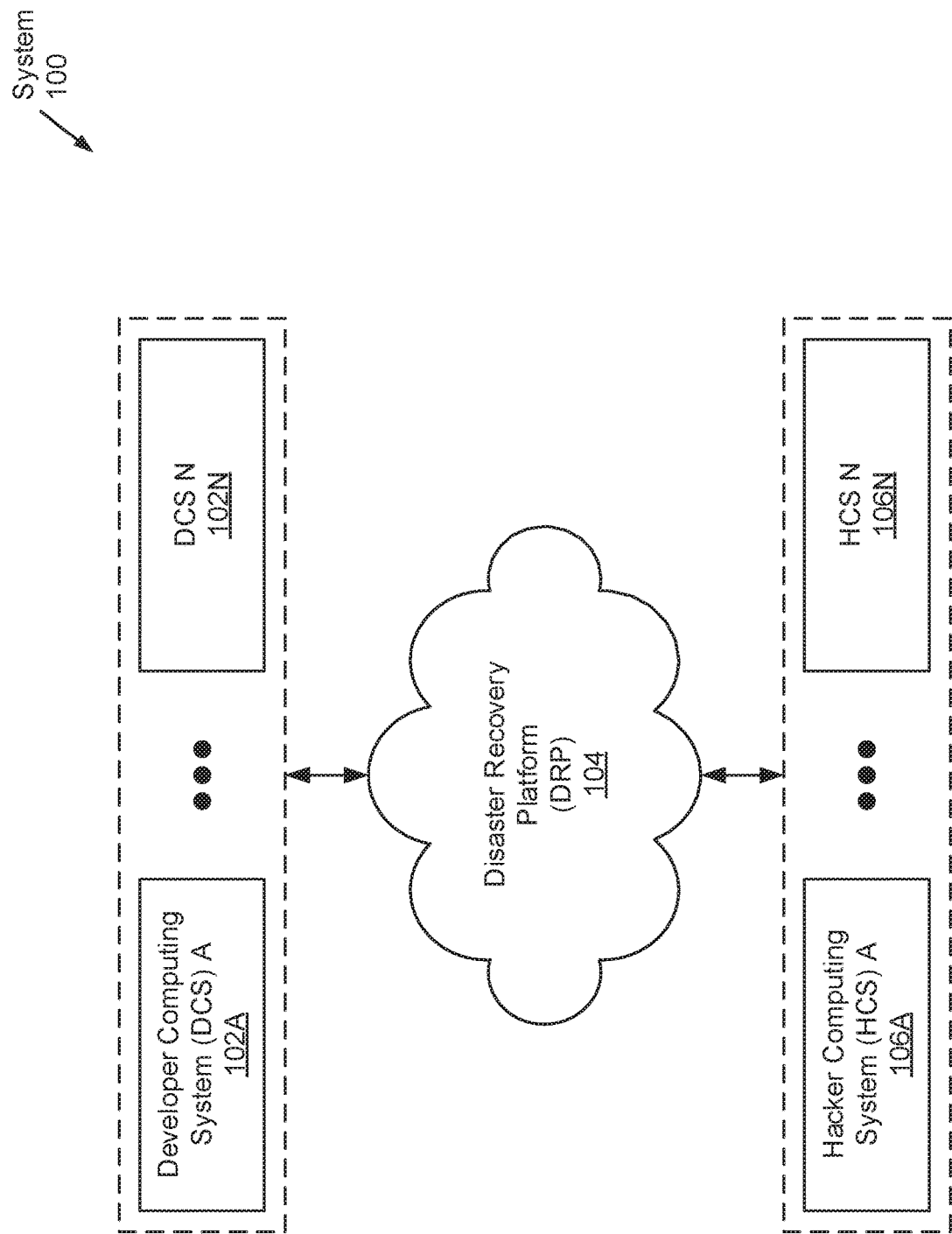
FIG. 1 shows a system in accordance with one or more embodiments of the invention.

FIG. 1 shows a system in accordance with one or more embodiments of the invention. The system (100) includes one or more developer computing systems (DCSs) (102A-102N) operatively connected to a disaster recovery platform (DRP) (104), which in turn may be operatively connected to one or more hacker computing systems (HCSs) (106A-106N). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that may facilitate communication and/or information exchange. Further, the aforementioned components may interact with one another using any combination of one or more wired and/or wireless communication protocols.

In one embodiment of the invention, a DCS (102A-102N) may be any computing system (see e.g., FIG. 5) on which cloud native applications (CNAs), or any other non-cloud native applications, may be developed. A CNA may be a software application or computer program that may be created and executes within a cloud computing environment. That is, a CNA may be a software application or computer program that may be developed for use within (and thus is native to) a cloud computing environment. In one embodiment of the invention, a CNA may be developed as a collaboration of microservices. Each microservice may implement a separate functionality or feature of the CNA. Further, each microservice may execute its own computer process (i.e., instance of a computer program) and may communicate with other microservices using a lightweight interface (e.g., messaging, hypertext transfer protocol (HTTP) resource application program interfaces (APIs), etc.). In other embodiments of the invention, a CNA may be developed using other non-microservice based architectures (e.g., monolithic architecture).

In one embodiment of the invention, each microservice may be implemented using one or more virtual machines (VMs) and/or containers, which may be deployed by the DCS (102A-102N) user/operator (e.g., an application developer/programmer, a system/datacenter administrator, etc.), a third party entity/user, or a combination thereof. A VM may be a distinct operating environment configured to inherit underlying functionality of the host operating system (OS) (and access to the underlying host hardware) using an abstraction layer. Further, a VM may include a separate instance of an OS, which may be distinct from the host OS. On the other hand, a container may be an isolated, lightweight virtualization mechanism that allows for the executing of an application or an OS within the container without the overhead of executing a hypervisor (i.e., a physical or virtual controller that serves to facilitate intra-host communication between one or more VMs and the host computer system hardware) (as is needed for executing VMs on underlying hardware). Substantively, minimal overhead may be generated by containers because: (i) containers share the same OS kernel with other containers and the underlying host computing system (e.g., a server); and (ii) containers, unlike VMs, do not need to emulate physical hardware.

In one embodiment of the invention, with respect to interfacing with the DRP (104), a DCS (102A-102N) may include functionality to: (i) generate one or more application granularity images (AGIs) (described below) based on one or more CNAs; (ii) transmit one or more AGIs to the DRP (104) for backup and archiving purposes; and (iii) receive cyber protection reports (CPRs) based on the outcome of cyber security assessments performed on one or more AGIs. One of ordinary skill will appreciate that a DCS (102A-102N) may perform other functionalities without departing from the scope of the invention. By way of examples, a DCS (102A-102N) may include one or more desktop computers, laptop computers, tablet computers, servers, mainframes, smailphones, gaming consoles, or any combination thereof.

In one embodiment of the invention, the DRP (104) may be a hardware and/or software implemented service that provides failover and cyber security using a cloud computing environment. The DRP (104) may be implemented on one or more servers (not shown). Each server may be a physical server or a virtual server that may be cloud-based. In one embodiment of the invention, the DRP (104) may be implemented on one or more computing systems similar to the exemplary computing system shown in FIG. 5.

In one embodiment of the invention, the DRP (104) may include functionality to: (i) receive one or more AGIs from one or more DCSs (102A-102N) for backup and archiving; (ii) perform internal cyber security assessments on one or more AGIs; (iii) obtain external cyber security assessments of one or more AGIs from one or more HCSs (106A-106N); (iv) generate CPRs based on the internal and/or external cyber security assessments; and (v) transmit CPRs to one or more DCSs (102A-102N). One of ordinary skill will appreciate that the DRP (104) may perform other functionalities without departing from the scope of the invention. Also, the DRP (104) is described in further detail below with respect to FIG. 2.

In one embodiment of the invention, a HCS (106A-106N) may be any computing system (see e.g., FIG. 5) operated by a computer security specialist, a white hat hacker, a grey hat hacker, or any other individual/entity that may improve security by exposing rather than exploiting vulnerabilities. In one embodiment of the invention, a cyber security vulnerability may be a flaw or weakness in system design, implementation, operation, internal controls, or management that could be exploited (either accidentally or intentionally). Further, the exploitation of a vulnerability may result in a security breach of a system, which may lead to, for example, data loss, exposure of sensitive data, lack of accountability, denial of access, data corruption, system hijacking and/or impersonation, and other undesirable outcomes.

In one embodiment of the invention, a HCS (106A-106N) may include functionality to: (i) obtain rights, privileges, and/or permissions for accessing and assessing content (e.g., anonymous AGIs (described below)) within one or more cloud computing testing sandboxes from the DRP (104); (ii) issue hacker vulnerabilities assessments (HVAs) based on external cyber security assessments performed on one or more anonymous AGIs; and (iii) receive financial compensation (e.g., compensation) commensurate to the issued HVAs. One of ordinary skill will appreciate that a HCS (106A-106N) may perform other functionalities without departing from the scope of the invention. By way of examples, a HCS (106A-106N) may include one or more desktop computers, laptop computers, tablet computers, servers, mainframes, smartphones, gaming consoles, or any combination thereof.

While FIG. 1 shows a configuration of components, other system configurations may be used without departing from the scope of the invention. For example, the system (100) may further include an online banking platform (not shown) operatively connected to the DRP (104) and one or more HCSs (106A-106N). The online banking platform may be a hardware and/or software implemented service that may provide a range of financial transactions offered by a financial institution (e.g., a bank).

In one embodiment of the invention, the online banking platform may be implemented on one or more servers (not shown). Each server may be a physical server or a virtual server that may be cloud-based. In another embodiment of the invention, the online banking platform may be implemented on one or more computing systems similar to the exemplary computing system shown in FIG. 5. Furthermore, the online banking platform may be a service employed by a HCS (106A-106N) user/operator to safeguard and mediate transactions involving financial currencies, assets, etc.

In one embodiment of the invention, with respect to interfacing with the DRP (104) and a HCS (106A-106N), the online banking platform may include functionality to: (i) receive financial transactions (e.g., deposits, wire transfers, bitcoin exchanges, etc.) on behalf of one or more HCS (106A-106N) users/operators from the DRP (104); and (ii) issue notifications detailing the receipt of financial transactions to one or more HCSs (106A-106N). One of ordinary skill will appreciate that the online banking platform may perform other functionalities without departing from the scope of the invention.

Figure 2:
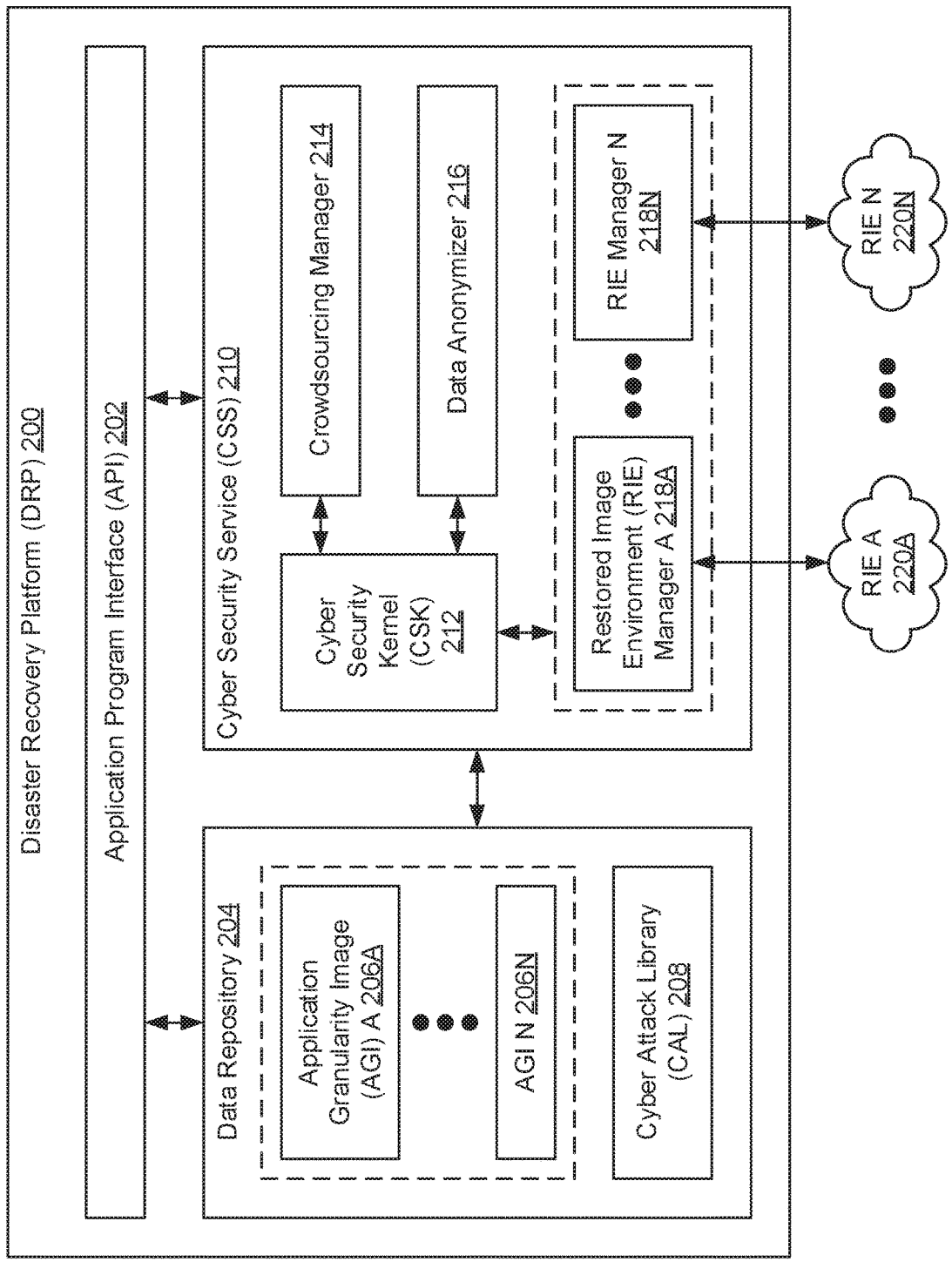
FIG. 2 shows a disaster recovery platform in accordance with one or more embodiments of the invention.

FIG. 2 shows a disaster recovery platform (DRP) in accordance with one or more embodiments of the invention. The DRP (200) includes an application program interface (API) (202), a data repository (204), and a cyber security service (CSS) (210). Each of these components is described below.

In one embodiment of the invention, the API (202) may be a hardware and/or software implemented construct that may provide a specification for the exchange of information between the DRP (200) and a DCS (not shown). The API (202) may further provide a specification for the exchange of information between the DRP (200) (or more specifically, the application granularity images (AGIs) restored within restored image environments (RIEs) instantiated by the DRP (200) (described below)) and a HCS (not shown). For example, the API (202) may establish that the exchange of information may entail a request for processing and a return of a response, if any, based on the outcome of the processing. In one embodiment of the invention, the API (202) may include logic necessary to access the data repository (204) and to interact with the CSS (210). By way of an example, the API (202) may be a web API accessed through a webpage and/or web browser, and a WAN (e.g., Internet) connection.

In one embodiment of the invention, the API (202) may include functionality to: (i) receive one or more AGIs (206A-206N) from one or more DCSs (not shown); (ii) access the data repository (204) to store obtained AGIs (206A-206N); (iii) receive CPRs (described below) from the CSS (210); (iv) transmit received CPRs to one or more DCSs; (v) mediate the accessing of one or more RIEs (220A-220N) by one or more HCSs (not shown); and (vii) relay financial transactions between the CSS (210) and one or more online banking platforms (not shown) and/or one or more HCSs. One of ordinary skill will appreciate that the API (202) may perform other functionalities without departing from the scope of the invention.

In one embodiment of the invention, the data repository (204) may be a storage system or medium for consolidating various forms of data. The data repository (204) may be implemented using any type of storage unit and/or device (e.g., a file system, a database, a collection of tables, or any other storage mechanism). Further, the data repository (204) may be implemented using multiple storage units and/or devices, which may or may not be of the same type or located at the same physical site. In one embodiment of the invention, the data repository (204) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM).

In one embodiment of the invention, the data repository (204) may be configured to store one or more AGIs (206A-206N). An AGI (206A-206N) may be an image-based snapshot of any granularity of an application (e.g., a CNA) at any given time of development. Specifically, with respect to granularity, and in one embodiment of the invention, an AGI (206A-206N) may represent as little as an exact copy of a VM or container directed at implementing a portion of a microservice. The aforementioned microservice portion may be responsible for enacting one or more (but not all) functionalities and features of the microservice, and thus, the CNA for which the microservice aids in implementing. In another embodiment of the invention, an AGI (206A-206N) may represent exact copies of multiple VMs and/or containers directed at implementing a complete microservice. The multiple VMs and/or containers, in this case, may implement all functionalities and features of the complete microservice, which in turn, however, may be responsible for enacting a subset of the functionalities and features of the CNA. Further, in yet another embodiment of the invention, an AGI (206A-206N) may represent exact copies of multiple microservices, where each microservice may be realized through a mutually exclusive set of VMs and/or containers. Accordingly, the multiple microservices may collaborate to enact all the functionalities and features of the corresponding CNA. In one embodiment of the invention, an AGI (206A-206N) may further include any data used by one or more microservices (e.g., data stored in a persistent storage volume linked to a container and/or virtual machine that implements at least a portion of the microservice(s)).

In one embodiment of the invention, the data repository (204) may also be configured to store a cyber attack library (CAL) (208). The CAL (208) may be a repository for storing sets of computer readable program code, which when executed by a computer processor, enables a RIE manager (218A-218N) (described below) to administer one or more known cyber security attacks to AGIs (206A-206N) restored within the RIEs (220A-220N) (see e.g., FIG. 3A). In one embodiment of the invention, the application of known cyber security attacks may represent a phase of the internal cyber security assessments performed on AGIs (206A-206N) by the CSS (210). Examples of cyber security attacks the CAL (208) may store include, but are not limited to including: malware, phishing attacks, password attacks, denial-of-service (DOS) attacks, man-in-the-middle (MITM) attacks, structured query language (SQL) injection attacks, cross-site scripting (XSS) attacks, session hijacking attacks, spear-phishing attacks, network probing attacks, brute-force cracking attacks, drive-by download attacks, advanced persistent threat (APT) attacks, and ransomware.

One of ordinary skill will appreciate that the data repository (204) may be configured to store additional data without departing from the scope of the invention.

In one embodiment of the invention, the CSS (210) may be a sub-service of or a feature hosted by the DRP (200). Specifically, the CSS (210) may be an analytics driven computer service offered to one or more DCSs (not shown) over the Internet (i.e., the cloud). The CSS (210) may be implemented using hardware, software, firmware, or any combination thereof. Furthermore, the CSS (210) includes a cyber security kernel (CSK) (212), a crowdsourcing manager (214), a data anonymizer (216), and one or more RIE managers (218A-218N). Each of these components is described below.

In one embodiment of the invention, the CSK (212) may be an application or computer program for the CSS (210) that may be executing on the underlying hardware (i.e., servers) of the DRP (200). The CSK (212) may include functionality to: (i) access the data repository (204) to retrieve one or more AGIs (206A-206N); (ii) instantiate one or more RIEs (220A-220N); (iii) configure RIEs (220A-220N) through the restoration of AGIs (206A-206N) or anonymous AGIs (not shown) therein; (iv) create, configure, or delete one or more RIE managers (218A-218N); (v) provide instructions to the crowdsourcing manager (214) and the data anonymizer (216) in accordance with embodiments of the invention (see e.g., FIGS. 3B and 3C); (vi) obtain internal and external cyber security assessments via one or more RIE managers (218A-218N); (vii) generate CPRs based on obtained cyber security assessments; and (viii) relay generated CPRs to the API (202) for transmission towards one or more DCSs (not shown). One of ordinary skill will appreciate that the CSK (212) may perform other functionalities without departing from the scope of the invention.

In one embodiment of the invention, the crowdsourcing manager (214) may be a computer process (or an instance of a computer program) executing on the underlying hardware of the DRP (200). Specifically, the crowdsourcing manager (214) may be a computer process dedicated towards the coordination of crowdsourcing activity involving the CSS (210) and one or more HCSs (not shown). In one embodiment of the invention, crowdsourcing may entail the receiving of contributions from third parties (e.g., HCS users/operators) in the form of services (e.g., cyber security services) in exchange for compensation commensurate of those services.

In one embodiment of the invention, the crowdsourcing manager (214) may include functionality to: (i) enlist the services of one or more crowdsourcing contributors (e.g., white hat hackers, grey hat hackers, computer security specialists, etc.) to perform external cyber security assessments of one or more AGIs; (ii) obtain service vulnerabilities assessments (SVAs) (described below) and hacker vulnerabilities assessments (HVAs) (described below) from the CSK (212); and (iii) provide commensurable compensation to one or more crowdsourcing contributors for the rendering of the aforementioned services based on the obtained SVAs and HVAs.

In one embodiment of the invention, the data anonymizer (216) may be a computer process (or an instance of a computer program) executing on the underlying hardware of the DRP (200). Specifically, the data anonymizer (216) may be a computer process dedicated towards the data scrubbing of AGIs (206A-206N). In one embodiment of the invention, data scrubbing may entail the encryption or removal of personally identifiable information from an AGI (206A-206N), thereby producing anonymous AGIs (not shown). The personally identifiable information may pertain to sensitive information that identifies, for example, the entity or users/operators responsible for developing the AGI (i.e., CNA granularity), the DCS used to develop the AGI, credit card and bank account information, passwords, etc. Further, the data scrubbing applied by the data anonymizer (216) may use any combination of one or more existing or future developed data anonymization techniques.

In one embodiment of the invention, a RIE manager (218A-218N) may be a computer process (or an instance of a computer program) executing on the underlying hardware of the DRP (200). Specifically, a RIE manager (218A-218N) may be a computer process dedicated towards the management and/or monitoring of one RIE (220A-220N). Subsequently, in one embodiment of the invention, a RIE manager (218A-218N) may include functionality to: (i) access the CAL (208) within the data repository (204) to retrieve one or more sets of computer readable program code; (ii) execute the one or more sets of computer readable program code to apply one or more known cyber security attacks to AGIs (206A-206N) restored in RIEs (220A-220N)—in order to expose one or more cyber security vulnerabilities; (iii) probe AGIs (206A-206N) and/or RIEs (220A-220N) to discover one or more cyber security vulnerabilities by employing one or more scanning methodologies (e.g., port scanning, network vulnerability scanning, web application security scanning, database security scanning, host based vulnerability scanning, etc.); and (iv) issue internal cyber security assessments (i.e., service vulnerabilities assessments (SVAs)) to the CSK (212) based on the results of the probing.

In one embodiment of the invention, a RIE (220A-220N) may be an isolated (i.e., closed and protected) cloud computing environment for executing cyber security assessments. Said another way, a RIE (220A-220N) may be a cloud based testing sandbox. Further, in one embodiment of the invention, a RIE (220A-220N) may be implemented using a subset of the servers and/or computing systems (see e.g., FIG. 5) that form the DRP (200). In another embodiment of the invention, a RIE (220A-220N) may be implemented using a set of servers and/or computing systems that exclude those from, yet may still be overseen by, the DRP (200). Moreover, isolation of a RIE (220A-220N) may be guaranteed through the implementation of a network configuration on a cloud computing network. The network configuration may, for example, limit access to the RIE (220A-220N) from external sources (e.g., DCSs, HCSs, etc.) (with the exception of the availability of one or more computer ports through which a RIE manager (218A-218N) may monitor/probe the RIE (220A-220N)). The network configuration may further, for example, obstruct access to external elements (e.g., DCSs, HCSs, etc.) by the computing resources (i.e., microservices, VMs, containers, etc.) executing within the RIE (220A-220N).

Figure 3A:
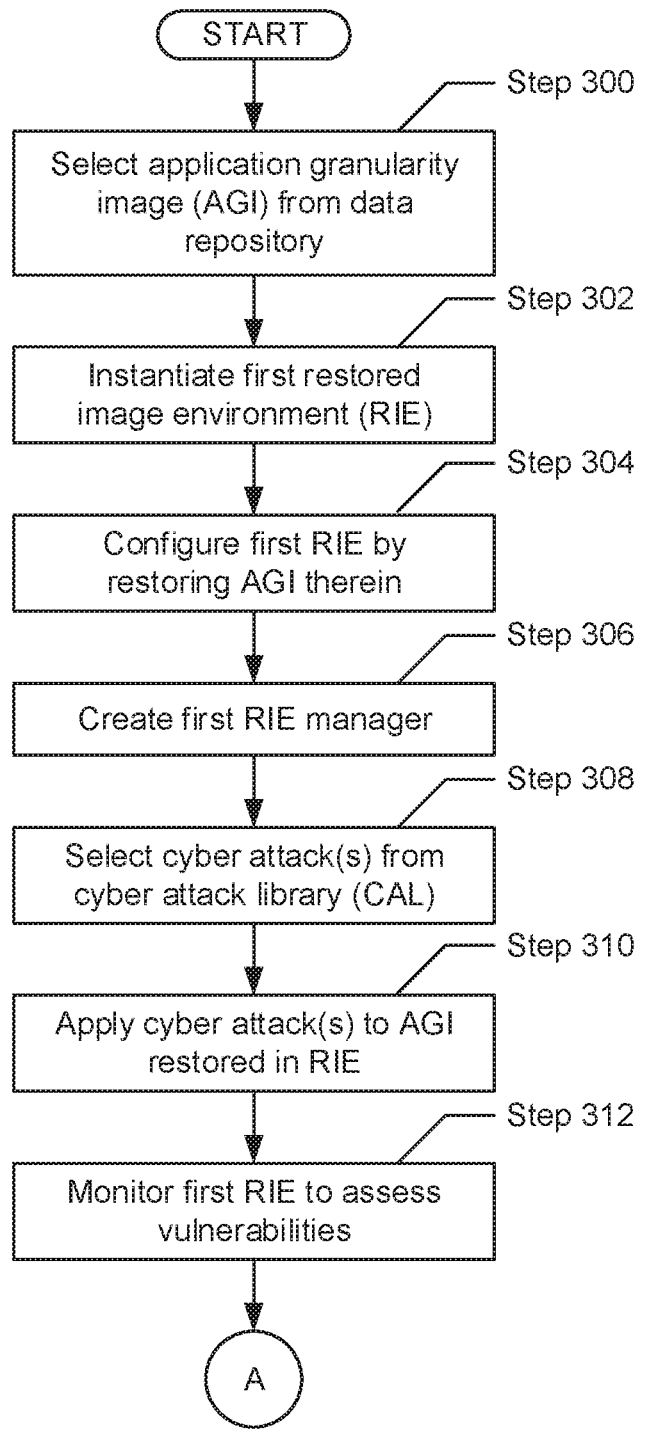
FIGS. 3A-3C show flowcharts describing a method for implementing a cloud native crowdsourced cyber security service in accordance with one or more embodiments of the invention.
Figure 3B:
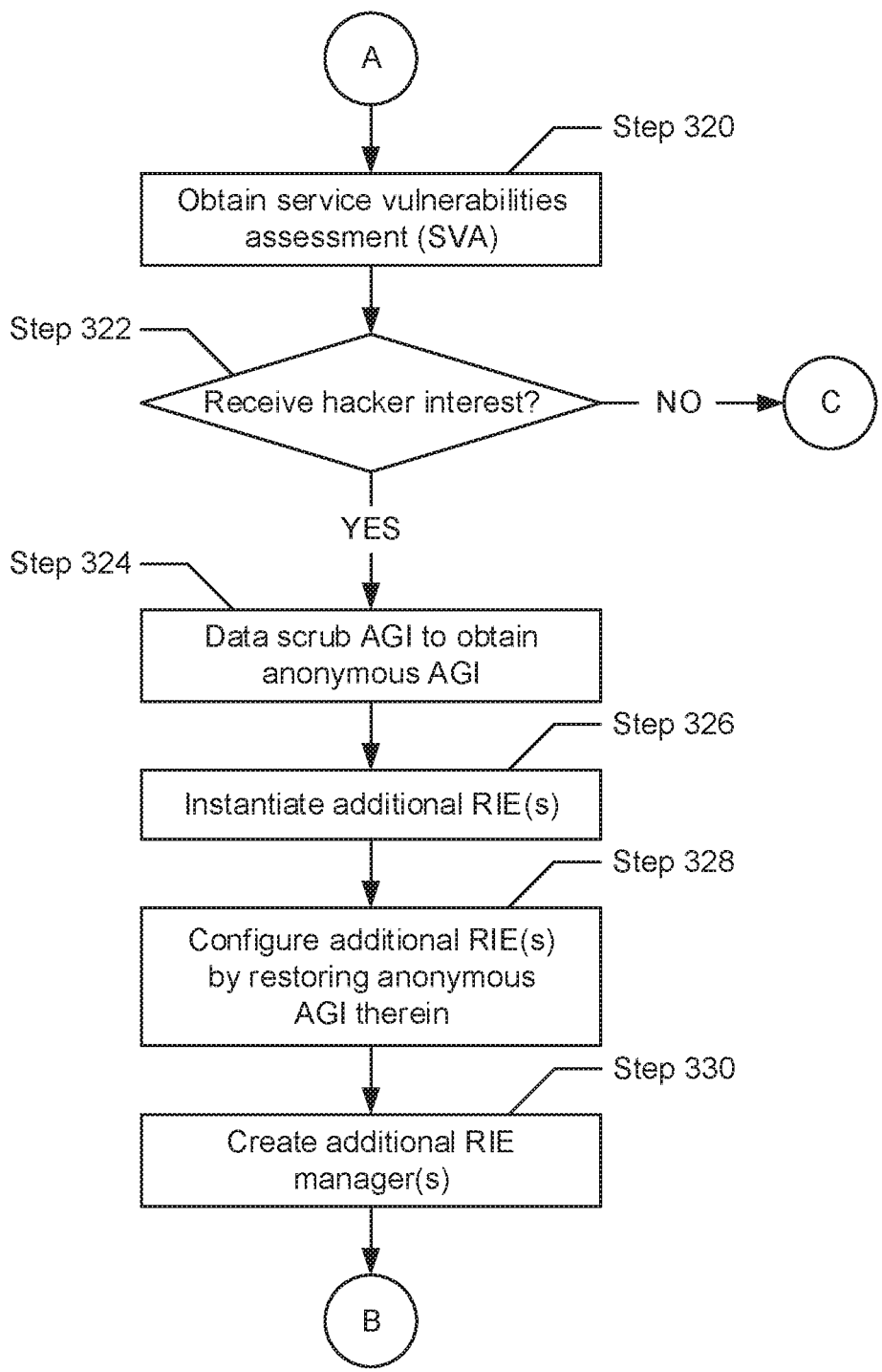
Figure 3C:
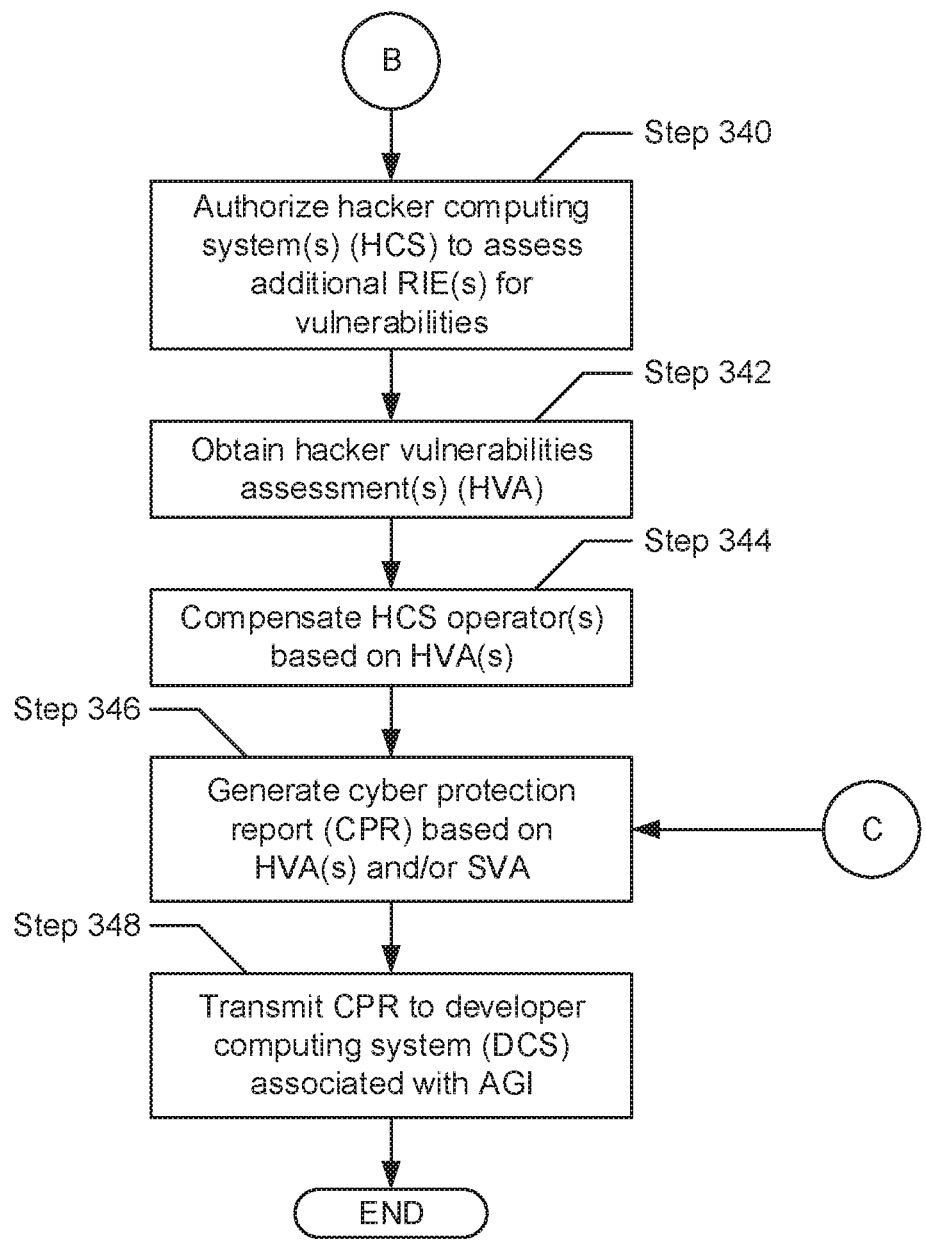

FIGS. 3A-3C show flowcharts describing a method for implementing a cloud native crowdsourced cyber security service in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, an AGI is selected. In one embodiment of the invention, the AGI may be selected from the data repository residing on the DRP (see e.g., FIG. 2) by the CSK and may pertain to a CNA granularity developed on a DCS (see e.g., FIG. 1). Further, selection of the AGI may be based on a preset periodicity for the activation of the CSS configured by administrators of the DCS.

In one embodiment of the invention, as described above, the CNA granularity an AGI may represent a single VM or container directed at implementing a portion of a microservice, where the microservice portion may be responsible for enacting one or more (but not all) functionalities and features of the microservice, and thus, one or more (but not all) functionalities and features of a CNA. In another embodiment of the invention, an AGI may represent multiple VMs and/or containers directed at implementing a complete microservice, where the multiple VMs and/or containers may be tasked with implementing all functionalities and features of the complete microservice. Subsequently, in such an embodiment, the complete microservice may similarly be responsible for enacting a subset of the functionalities and features of the CNA. In yet another embodiment of the invention, an AGI may represent multiple microservices, where each microservice may be realized through a mutually exclusive set of VMs and/or containers. Accordingly, in such an embodiment, the multiple microservices may collaborate to enact all the functionalities and features of the corresponding CNA.

In Step 302, a first RIE is instantiated. In one embodiment of the invention, instantiation of a RIE may be performed by the CSK, and may substantively entail the allotment/dedication of cloud environment computing resources (e.g., computer processors, memory, persistent and/or non-persistent storage, network bandwidth, etc.) towards the creation and deployment of a cloud based testing sandbox. In one embodiment of the invention, the aforementioned cloud environment computing resources may derive from the servers and/or computing systems forming the DRP. In another embodiment of the invention, the cloud environment computing resources may derive from other servers and/or computing systems excluded from, yet may still be overseen by, the DRP.

In Step 304, the first RIE is configured. Specifically, in one embodiment of the invention, configuration of the first RIE may entail the CSK restoring the AGI (selected in Step 300) therein. More specifically, the CSK may allocate additional cloud environment computing resources towards the instantiation of one or more VMs and/or containers directed at emulating the behavior, functionalities, and/or interactivities of a portion of a microservice, a complete microservice, or multiple collaborative microservices (i.e., a full CNA).

In one embodiment of the invention, configuration of the first RIE may alternatively entail the CSK restoring an anonymized AGI therein. An anonymized AGI may be first obtained by data scrubbing the AGI (selected in Step 300). Specifically, data scrubbing the AGI may be performed by the data anonymizer (see e.g., FIG. 2). Furthermore, as discussed above, data scrubbing the AGI may entail the encryption or removal of personally identifiable information from the AGI. The personally identifiable information may pertain to sensitive information that identifies, for example, the entity or users/operators responsible for developing the AGI (i.e., CNA granularity), the DCS used to develop the AGI, credit card and bank account information, passwords, etc. Further, the data scrubbing applied by the data anonymizer may use any combination of one or more existing or future developed data anonymization techniques.

In Step 306, a first RIE manager (see e.g., FIG. 2) is created. In one embodiment of the invention, creation of a RIE manager may be performed by the CSK, and may substantively entail the dedication of at least one computer process (or instance of a computer program) executing within the CSS. Thereafter, the dedicated computer process(es) may be afforded with functionalities befitting those necessary for executing known cyber security attacks, monitoring/probing RIEs, and generating internal cyber security assessments based on the testing performed by the RIE manager.

In Step 308, a set of one or more known cyber security attacks is selected. In one embodiment of the invention, the set of known cyber security attacks may be retrieved by the first RIE manager (created in Step 306) from the CAL residing within the DRP data repository. Particularly, the first RIE manager may access the CAL to obtain one or more scripts/sets of computer readable program code—each of which represent an algorithm for implementing one of the set of one or more known cyber security attacks. Furthermore, in one embodiment of the invention, the set of known cyber security attacks may be selected based on a preset cyber protection configuration tailored by users/operators of the DCS associated with the restored AGI.

In Step 310, the set of known cyber security attacks (selected in Step 308) is applied. Specifically, in one embodiment of the invention, the first RIE manager may execute the obtained scripts/sets of computer readable program code obtained from the CAL in order to apply the set of known cyber security attacks to the AGI restored in the first RIE. In another embodiment of the invention, the first RIE manager may execute the obtained scripts/sets of computer readable program code (obtained from the CAL) in order to apply the set of known cyber security attacks to an anonymous AGI restored in the first RIE. In one embodiment of the invention, the first RIE manager may execute each script/set of computer readable program code sequentially, thereby applying each corresponding known cyber security attack sequentially. In another embodiment of the invention, the first RIE manager may alternatively instantiate multiple processes or threads to execute two or more obtained scripts/sets of computer readable program code, corresponding to two or more known cyber security attacks, concurrently.

In Step 312, the restored AGI (or anonymous AGI) within the first RIE is monitored during or following the application of the known cyber security attacks. In one embodiment of the invention, the monitoring may be performed by the first RIE manager in order to expose, detect, and/or assess for any cyber security vulnerabilities. Once more, a cyber security vulnerability may be a flaw or weakness in system design, implementation, operation, internal controls, or management that could be exploited (either accidentally or intentionally). Further, exploitation of a vulnerability may result in a security breach of a system, which may lead to, for example, data loss, exposure of sensitive data, lack of accountability, denial of access, data corruption, system hijacking and/or impersonation, and other undesirable outcomes. In one embodiment of the invention, monitoring of the restored AGI (or anonymous AGI) within the first RIE may entail the employing of one or more existing or future developed scanning techniques, which may include, but are not limited to, techniques directed to port scanning, network vulnerability scanning, web application security scanning, database security scanning, and host based vulnerability scanning.

Turning to FIG. 3B, in Step 320, a service vulnerabilities assessment (SVA) is obtained. In one embodiment of the invention, the SVA may be generated by the first RIE manager based on the monitoring/probing of the restored AGI (or anonymous AGI) within the first RIE (performed in Step 312) and promptly submitted to the CSK. In one embodiment of the invention, the SVA may be a report detailing the cyber security vulnerabilities detected by the CSS. Further, the SVA may additionally detail the circumstances under which each of the cyber security vulnerabilities, if any, had been detected. These circumstances may include, but are not limited to including: (i) which microservice(s) (or which VM(s)/container(s)) implementing the AGI (or anonymous AGI) is/are the discovered flaw(s) or weakness(es); (ii) which cyber security attack(s) exploited the discovered flaw(s)/weakness(es); and (iii) the extent and severity of effects introduced by the cyber security attack(s) on the restored AGI (or anonymous AGI) (i.e., CNA granularity) through exploitation of the discovered flaw(s)/weakness(es).

In Step 322, a determination is made as to whether hacker interest has been received. Particularly, in one embodiment of the invention, hacker interest may represent an exhibited interest by at least one HCS user/operator (e.g., a white or grey hat hacker, a computer security specialist, etc.) to contribute towards the assessing of an AGI. Furthermore, hacker interest may be received in the form of HCS user/operator interactions with the crowdsourcing manager (see e.g., FIG. 2) of the CSS. Specifically, these interactions may include, for example: (i) the browsing, by a HCS user/operator, of an anonymized AGI catalog that may list one or more AGIs stored in the DRP data repository; (ii) the selecting, by the HCS user/operator, of an AGI (i.e., the same AGI as the AGI restored in the first RIE) from the aforementioned anonymized AGI catalog; and (iii) the submitting, by the HCS user/operator, of a request for instructions highlighting the services/work to be rendered in exchange for commensurable compensation. Subsequently, if it is determined that at least one HCS user/operator has exhibited interest (by, for example, browsing/selecting the AGI and submitting a request for instructions), then the process proceeds to Step 324. On the other hand, if it is alternatively determined that no/zero HCS users/operators have exhibited interest, then the process proceeds to Step 346 (see e.g., FIG. 3C).

In Step 324, after determining (in Step 322) that at least one HCS user/operator has exhibited hacker interest to assess the AGI, the AGI (selected in Step 300) is data scrubbed. In one embodiment of the invention, data scrubbing the AGI may be performed by the data anonymizer (see e.g., FIG. 2) and may thus result in the obtaining of an anonymous AGI. Furthermore, as discussed above, data scrubbing the AGI may entail the encryption or removal of personally identifiable information from the AGI. The personally identifiable information may pertain to sensitive information that identifies, for example, the entity or users/operators responsible for developing the AGI (i.e., CNA granularity), the DCS used to develop the AGI, credit card and bank account information, passwords, etc. Further, the data scrubbing applied by the data anonymizer may use any combination of one or more existing or future developed data anonymization techniques.

In Step 326, additional one or more RIEs are instantiated. More specifically, an additional RIE may be instantiated for each HCS user/operator of the at least one HCS users/operators that exhibited hacker interest to assess the AGI. For example, consider a scenario whereby it was determined (in Step 322) that three different HCS users/operators submitted requests for instructions towards assessing the AGI. Accordingly, (i) a second RIE may be instantiated to accommodate testing to be performed by a first HCS user/operator, (ii) a third RIE may be instantiated to accommodate testing to be performed by a second HCS user/operator, and (iii) a fourth RIE may be instantiated to accommodate testing to be performed by a third HCS user/operator. In one embodiment of the invention, instantiation of each additional RIE may be realized similarly to how the first RIE is instantiated (see e.g., Step 302).

In Step 328, each additional RIE (instantiated in Step 326) is subsequently configured. Specifically, in one embodiment of the invention, each additional RIE may be configured by the CSK through the restoration of the anonymous AGI (obtained through data scrubbing of the AGI in Step 324) therein. Further, restoration of the anonymous AGI (in each additional RIE) may entail allocating additional cloud environment computing resources towards the instantiation of one or more VMs and/or containers directed at emulating the behavior, functionalities, and/or interactivities of a portion of a microservice, a complete microservice, or multiple collaborative microservices (i.e., a full CNA).

In Step 330, a respective additional RIE manager is created for each additional RIE (instantiated in Step 326). In one embodiment of the invention, creation of each additional RIE manager (similar to the creation of the first RIE manager in Step 306) may be performed by the CSK and may entail the dedication of at least one computer process (or instance of a computer program) executing within the CSS. Thereafter, the dedicated computer process(es) may be afforded with functionalities befitting those necessary for monitoring/probing RIEs and generating external cyber security assessments based on the testing performed by a HCS user/operator.

Turning to FIG. 3C, in Step 340, access authorization of each additional RIE is granted to a HCS of a respective HCS user/operator. That is, in following the above example cited in Step 326: (i) access authorization to the second RIE may be granted to a first HCS belonging to the first HCS user/operator; (ii) access authorization to the third RIE may be granted to a second HCS belonging to the second HCS user/operator; and (iii) access authorization to the fourth RIE may be granted to a third HCS belonging to the third HCS user/operator.

In one embodiment of the invention, the granting of an access authorization may entail the reconfiguring of a network configuration (described above) that may outline, but is not limited to outlining the access permissions for each RIE instantiated by the CSS. More specifically, the network configuration may be adjusted so that further to the availability of one or more computer ports through which RIE managers may access a respective RIE, one or more other computer ports may be made available (i.e., opened) for each additional RIE in order to facilitate access of each additional RIE by a respective HCS. In one embodiment of the invention, instructions issued by the CSS to a HCS (in response to the request for instructions submitted by a HCS user/operator when exhibiting hacker interest) may include, but is not limited to including, the computer port number(s) and communication protocol pertinent to accessing the instantiated additional RIE designated for the HCS user/operator. In one embodiment of the invention, this information may be directed to and handled by an HCS, and therefore, transparent to the HCS user/operator.

In one embodiment of the invention, after being granted access authorization to one of the additional RIEs, a HCS user/operator may execute their cyber security assessments of the anonymous AGI restored therein. Further, in one embodiment of the invention, while the external cyber security assessments are taking place, the respective additional RIE manager may monitor the activities performed within the additional RIE and/or interact with the HCS user/operator. The monitoring and/or interacting may lead to the generation of a report (discussed below) describing the external cyber security assessment.

In Step 342, a hacker vulnerabilities assessment (HVA) (i.e., external cyber security assessment report) is generated for each additional RIE. Specifically, in one embodiment of the invention, a HVA may be generated by each additional RIE manager based on the monitoring/probing of the restored anonymous AGI within each of the additional RIEs and promptly submitted to the CSK. In one embodiment of the invention, a HVA may be a report detailing the cyber security vulnerabilities detected by a HCS user/operator. Further, a HVA may additionally detail the circumstances under which each of the cyber security vulnerabilities, if any, had been detected. These circumstances may include, but are not limited to including: (i) which microservice(s) (or which VM(s)/container(s)) implementing the anonymous AGI is/are the discovered flaw(s) or weakness(es); (ii) which cyber security attack(s) exploited the discovered flaw(s)/weakness(es); and (iii) the extent and severity of effects introduced by the cyber security attack(s) on the restored anonymous AGI (i.e., CNA granularity) through exploitation of the discovered flaw(s)/weakness(es).

In one embodiment of the invention, the cyber security vulnerabilities identified by an internal cyber security assessment (i.e., detailed in a SVA) may or may not specify different cyber security vulnerabilities identified by an external cyber security assessment (i.e., detailed in a HVA). That is, in one embodiment of the invention, one or more cyber security vulnerabilities may be discovered both (internally) by the CSS and (externally) by at least one HCS user/operator. In another embodiment of the invention, one or more cyber security vulnerabilities may be discovered (internally) by the CSS, however, not exposed (externally) by at least one HCS user/operator. Further, in yet another embodiment of the invention, one or more cyber security vulnerabilities may be discovered (externally) by at least one HCS user/operator, however, not exposed (internally) by the CSS.

In Step 344, each HCS user/operator (that exhibited hacker interest) is compensated. In one embodiment of the invention, the amount of compensation provided to each HCS user/operator may depend on their respective external cyber security assessments (i.e., detailed in a HVA) in comparison to an internal cyber security assessment (i.e., detailed in a SVA). By way of an example, a HCS user/operator may receive more compensation for identifying at least one cyber security vulnerability that may have not been previously identified through the internal assessment conducted by the CSS. Conversely, by way of another example, a HCS user/operator may receive a minimum compensation for identifying (and thus verifying) one or more cyber security vulnerabilities that had been previously identified through the internal assessment conducted by the CSS. One of ordinary skill will appreciate that other metrics may be employed for determining the amount of compensation a HCS user/operator may be awarded for their crowdsourcing services.

In Step 346, a cyber protection report (CPR) is generated by the CSK. In one embodiment of the invention, the CPR may be generated based solely on the SVA (rendered in Step 320) after determining (in Step 322) that no/zero HCS users/operators exhibited hacker interest in further assessing the AGI. Alternatively, in another embodiment of the invention, the CPR may be generated based on the SVA and one or more HVAs (rendered in Step 342) after determining (in Step 322) that at least one HCS user/operator exhibited the aforementioned hacker interest. Furthermore, in addition to summarizing the one or more HVAs and/or the SVA therein, in one embodiment of the invention, the CPR may also include one or more recommendations for patching the cyber security vulnerabilities exposed through conducting of the external and/or internal assessments.

In Step 348, after generating the CPR (in Step 346), the CPR is transmitted to the DCS from which the AGI (selected in Step 300) originates. Specifically, in one embodiment of the invention, the CSK may provide the CPR to the API executing on the DRP. Thereafter, the API may format and/or encode the CPR based on the specification for data exchange agreed upon between the DRP and the DCS, and finally, the API may subsequently transmit the CPR towards the DCS.

Figure 4:
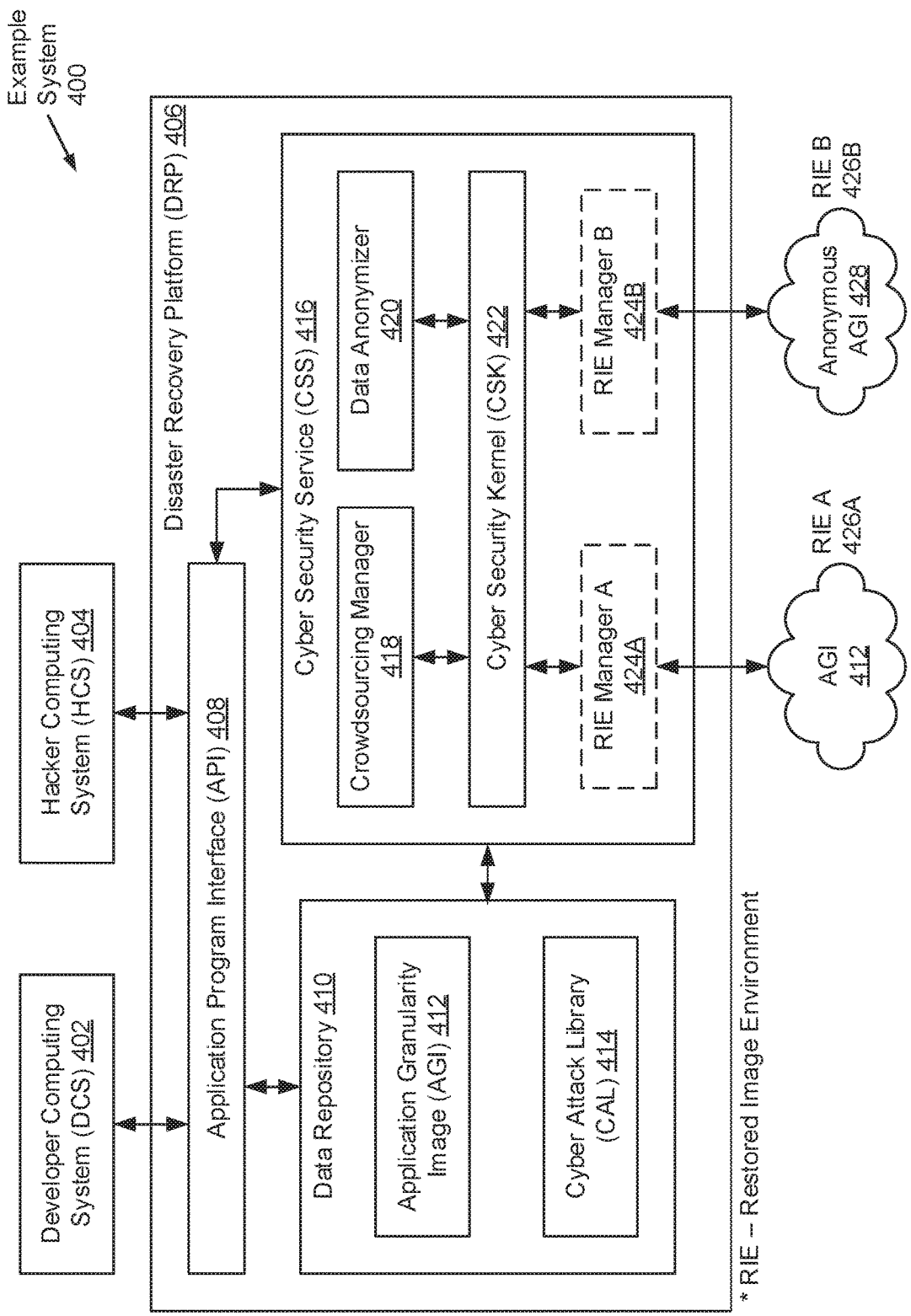
FIG. 4 shows an example system in accordance with one or more embodiments of the invention.

FIG. 4 shows an example system in accordance with one or more embodiments of the invention. The following example, presented in conjunction with components shown in FIG. 4, is for explanatory purposes only and not intended to limit the scope of the invention.

Turning to FIG. 4, the example system (400) includes a DCS (402) and a HCS (404) operatively connected to a DRP (406) via the DRP API (408). The DRP (406) further includes a data repository (410) and a CSS (416). The data repository (410) may be configured to store an AGI (412) (submitted to the DRP (406) by the DCS (402)) and a CAL (414) holding computer readable program code for one or more known cyber security attacks. Moreover, the CSS (416) includes a crowdsourcing manager (418), a data anonymizer (420), and a CSK (422). Through the example scenario described below, the CSS (416) may further include two RIE managers (424A, 424B), where each RIE manager (424A, 424B) may be responsible for one of two RIEs (426A, 426B).

Turning to the example, consider a scenario whereby the user/operator or entity associated with the DCS (402) has opted to enroll in the cloud native crowdsourced cyber security service feature offered by the DRP (406). That is to say, in addition to using the DRP (406) as a backup and archiving solution, the enrollment grants the testing of CNA granularities submitted by the DCS (402) towards exposing cyber security vulnerabilities, if any.

Upon activation, the CSK (422) accesses the data repository (410) to retrieve the AGI (412) submitted by the DCS (402). For the purposes of this example, consider that the AGI (412) is an exact copy of a complete microservice that implements a functionality of a new cloud native email application being developed by the DCS (402) entity/user/operator. After retrieving the AGI (412), the CSK (422) subsequently instantiates a first RIE (426A). Thereafter, the CSK (422) configures the first RIE (426A) by restoring the retrieved AGI (412) therein. Specifically, the CSK (422) restores the retrieved AGI (412) by allocating cloud environment computing resources towards the instantiation of VMs and/or containers that implement the aforementioned complete microservice. More specifically, the VMs and/or containers may be tasked with emulating the behavior, functionalities, and/or interactivities of the complete micro service.

After configuring the first RIE (426A), the CSK (422) proceeds to create a first RIE manager (424A) to oversee the internal cyber security assessment to be performed on the AGI (412) restored within the first RIE (426A). Creation of the first RIE manager (424A) may expend additional cloud environment computing resources. Thereafter, the first RIE manager (424A) accesses the CAL (414) (within the data repository (410)) to obtain scripts/sets of computer readable program code and data representing algorithms for implementing known cyber security attacks. By way of an example, one of the known cyber security attacks stored in the CAL (414) may relate to a spear-phishing attack. For reference, a spear-phishing attack may be an email-spoofing attack that targets an individual or business, where the attack seeks unauthorized access to sensitive information such as, for example, credit card and bank account numbers, passwords, and other sensitive information.

The first RIE manager (424A) then proceeds to apply the known cyber security attacks to the AGI (412) restored within the first RIE (426A). Specifically, the first RIE manager (424A) applies the known cyber security attacks, either sequentially or concurrently, by executing the scripts/sets of computer readable program code sequentially or concurrently, respectively. Furthermore, while or following the impact of the known cyber security attacks on the AGI (412), the first RIE manager (424A) monitors and records the happenings of the internal cyber security assessment. Based on the applying of the known cyber security attacks and the monitoring/recording of the effects, the first RIE manager (424A) generates a SVA (not shown). Promptly thereafter, the first RIE manager (424A) forwards the SVA to the CSK (422).

In one sub-scenario, after receiving the SVA from the first RIE manager (424A), the CSK (422) interfaces with the crowdsourcing manager (418) to determine that no/zero hacker interests have been received for further assessing the AGI (412). In response to this determination, the CSK (422) generates a CPR (not shown) based on the SVA, including recommendations for patching cyber security vulnerabilities detected by the internal assessment. Afterwards, the CSK (422) relays the CPR to the API (408), which in turn, encodes and transmits the CPR to the DCS (402).

In another sub-scenario, after receiving the SVA from the first RIE manager (424A), the CSK (422) interfaces with the crowdsourcing manager (418) to determine that hacker interest has been received for further assessing the AGI (412). The hacker interest may take the form of a request submitted by a user/operator of the HCS (404) for instructions pertaining to accessing and evaluating the AGI (412) in exchange for commensurable compensation (i.e., crowdsourcing services). In response to this determination, the CSK (422) instructs the data anonymizer (420) to data scrub the AGI (412). Data scrubbing the AGI (412) encrypts or removes any personally identifiable information associated with the AGI (412), thereby producing an anonymous AGI (428).

After obtaining the anonymous AGI (428) from the data anonymizer (420), the CSK (422) then instantiates a second RIE (426B) which is then configured through the restoration of the anonymous AGI (428) therein. Further, the CSK (422) creates a second RIE manager (424B) to oversee the external cyber security assessment to be performed on the anonymous AGI (428) restored within the second RIE (426B). From here, the CSK (422) then grants access authorization to the HCS (404) by opening an additional communicate port/socket dedicated to the second RIE (426B) for use by the HCS (404).

Once granted access, the HCS (404) entity or user/operator proceeds to conduct their external cyber security assessment on the anonymous AGI (428). The assessment may entail the applying of one or more same cyber security attacks known to the CSS (416) (i.e., stored in the CAL (414)) and/or one or more other cyber security attacks unknown to the CSS (416) (i.e., not stored in the CAL (414)). Thereafter, the HCS (404) user/operator and/or the second RIE manager (424B) monitors and records the effects of the applied cyber security attacks to generate a HVA (not shown). Subsequently, the second RIE manager (424B) forwards the HVA to the CSK (422).

After receiving the HVA from the second RIE manager (424B), the CSK (422) may share the HVA and the SVA (obtained earlier) with the crowdsourcing manager (418). The crowdsourcing manager (418) then compares results detailed in the HVA with results detailed in the SVA to appropriately compensate the HCS (404) user/operator for their efforts. The comparison between the HVA and the SVA may include, but is not limited to including: (i) determining whether the external assessment exposed any cyber security vulnerabilities also detected by the internal assessment; (ii) determining whether the external assessment exposed one or more cyber security vulnerabilities not discovered by the internal assessment; and/or (iii) determining whether the external assessment was not able to expose one or more cyber security vulnerabilities that were detected by the internal assessment. Furthermore, the crowdsourcing manager (418) may compensate the HCS (404) user/operator by submitting an electronic deposit or money transfer (via the API (408)) to an online banking platform (not shown) with which the HCS (404) user/operator is registered.

The crowdsourcing manager (418) may then notify the CSK (422) as to the completion of the compensation process. In response to the notification, the CSK (422) generates a CPR (not shown) based on the SVA and the HVA, including recommendations for patching cyber security vulnerabilities discovered through both the internal and external assessments. Afterwards, the CSK (422) relays the CPR to the API (408), which in turn, encodes and transmits the CPR to the DCS (402).

Figure 5:
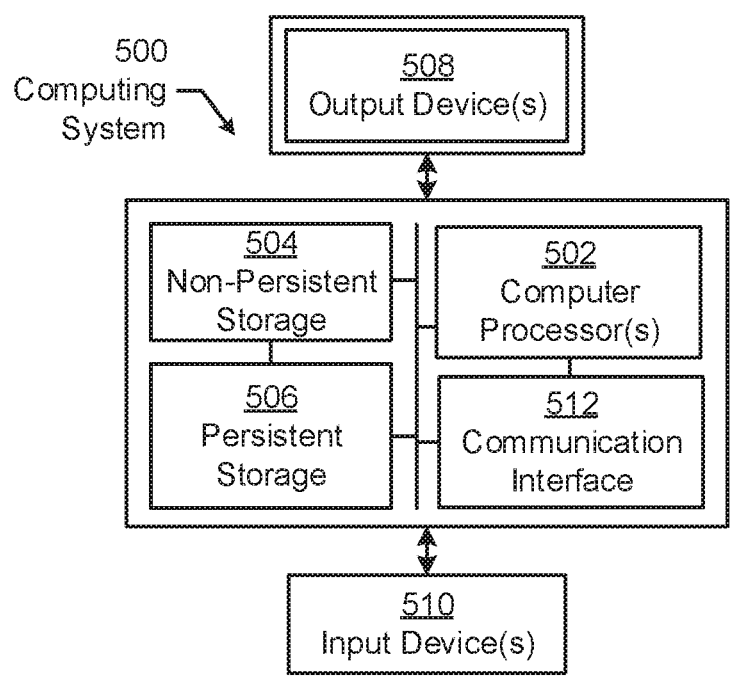
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for crowdsourcing cyber security, comprising:
   selecting an application granularity image (AGI);
   data scrubbing the AGI to obtain an anonymous AGI;
   restoring the anonymous AGI in a first restored image environment (RIE);
   crowdsourcing an external cyber security assessment of the anonymous AGI; and
   generating a hacker vulnerabilities assessment (HVA) in response to crowdsourcing the external cyber security assessment of the anonymous AGI.

2. The method of claim 1, wherein the AGI is an image-based snapshot of a cloud native application (CNA) granularity, wherein the CNA granularity comprises one selected from a group consisting of a microservice portion, a complete microservice, and a set of collaborative microservices.

3. The method of claim 1, wherein the first RIE is an isolated cloud computing testing sandbox, wherein restoring the anonymous AGI in the first RIE comprises allocating cloud environment computing resources to instantiate a set of virtual components to emulate the anonymous AGI.

4. The method of claim 3, wherein the set of virtual components comprises at least one of a group consisting of a virtual machine and a container.

5. The method of claim 1, further comprising:
   prior to data scrubbing the AGI to obtain the anonymous AGI:
      restoring the AGI in a second RIE;
      selecting a set of known cyber security attacks from a cyber attack library (CAL);

applying the set of known cyber security attacks to the AGI restored within the second RIE; and based on the applying, performing an internal cyber security assessment of the AGI to generate a service vulnerabilities assessment (SVA).

6. The method of claim 5, further comprising:

after generating the HVA:

compensating a crowdsourcing contributor based on the HVA and the SVA.

7. The method of claim 6, further comprising:

after compensating the crowdsourcing contributor:

generating a cyber protection report (CPR) based on the HVA and the SVA; and providing the CPR to a developer computing system (DCS) from which the AGI originates.

8. A disaster recovery platform (DRP), comprising:

a computer processor;

a data repository operatively connected to the computer processor; and a cyber security service (CSS) executing on the computer processor, and programmed to:

select an application granularity image (AGI) from the data repository;

data scrub the AGI to obtain an anonymous AGI;

instantiate a first restored image environment (RIE);

restore the anonymous AGI within the first RIE;

crowdsource an external cyber security assessment of the anonymous AGI; and generate a hacker vulnerabilities assessment (HVA) in response to crowdsourcing the external cyber security assessment of the anonymous AGI.

9. The DRP of claim 8, further comprising:

an application program interface (API) executing on the computer processor and operatively connected to the data repository and the CSS.

10. The DRP of claim 8, further comprising:

a developer computing system (DCS) comprising another computer processor and operatively connected to the DRP, wherein the AGI originates from the DCS.

11. The DRP of claim 8, further comprising:

a hacker computing system (HCS) comprising another computer processor and operatively connected to the DRP, wherein a HCS operator conducts the external cyber security assessment through crowdsourcing.

12. The DRP of claim 8, wherein the CSS is further programmed to:

prior to data scrubbing the AGI to obtain the anonymous AGI:

instantiate a second RIE;

restore the AGI within the second RIE;

select a set of known cyber security attacks from the data repository;

apply the set of known cyber security attacks to the AGI restored within the second RIE; and based on the applying, perform an internal cyber security assessment of the AGI.

13. The DRP of claim 12, wherein the CSS comprises:

a data anonymizer executing on the computer processor and configured to generate the anonymous AGI through data scrubbing;

a crowdsourcing manager executing on the computer processor and configured to enlist and provide compensation for the external cyber security assessment;

a first RIE manager executing on the computer processor and configured to generate the HVA;

a second RIE manager executing on the computer processor and configured to generate a service vulnerabilities assessment (SVA) based on the internal cyber security assessment; and a cyber security kernel (CSK) executing on the computer processor and configured to coordinate the data anonymizer, the crowdsourcing manager, the first RIE manager, and the second RIE manager.

14. A non-transitory computer readable medium (CRM) comprising computer readable program code, which when executed by a computer processor, enables the computer processor to:

select an application granularity image (AGI);

data scrub the AGI to obtain an anonymous AGI;

restore the anonymous AGI in a first restored image environment (RIE);

crowdsource an external cyber security assessment of the anonymous AGI; and generate a hacker vulnerabilities assessment (HVA) in response to crowdsourcing the external cyber security assessment of the anonymous AGI.

15. The non-transitory CRM of claim 14, wherein the AGI is an image-based snapshot of a cloud native application (CNA) granularity, wherein the CNA granularity comprises one selected from a group consisting of a microservice portion, a complete microservice, and a set of collaborative microservices.

16. The non-transitory CRM of claim 14, wherein the first RIE is an isolated cloud computing testing sandbox, wherein restoring the anonymous AGI in the first RIE comprises allocating cloud environment computing resources to instantiate a set of virtual components to emulate the anonymous AGI.

17. The non-transitory CRM of claim 16, wherein the set of virtual components comprises at least one of a group consisting of a virtual machine and a container.

18. The non-transitory CRM of claim 14, further comprising computer readable program code, which when executed by the computer processor, enables the computer processor to:

prior to data scrubbing the AGI to obtain the anonymous AGI:

restore the AGI in a second RIE;

select a set of known cyber security attacks from a cyber attack library (CAL);

apply the set of known cyber security attacks to the AGI restored within the second RIE; and based on the applying, perform an internal cyber security assessment of the AGI to generate a service vulnerabilities assessment (SVA).

19. The non-transitory CRM of claim 18, further comprising computer readable program code, which when executed by the computer processor, enables the computer processor to:

after generating the HVA:

compensate a crowdsourcing contributor based on the HVA and the SVA.

20. The non-transitory CRM of claim 19, further comprising computer readable program code, which when executed by the computer processor, enables the computer processor to:

after compensating the crowdsourcing contributor:

generate a cyber protection report (CPR) based on the HVA and the SVA; and provide the CPR to a developer computing system (DCS) from which the AGI originates.

* * * * *